Jan. 27, 1925.
T. H. KRUEGER
CARRIER FOR PACKAGES AND THE LIKE
Filed Jan. 7, 1921     5 Sheets-Sheet 1
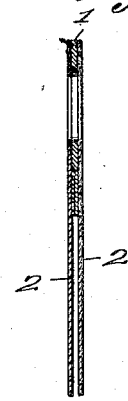
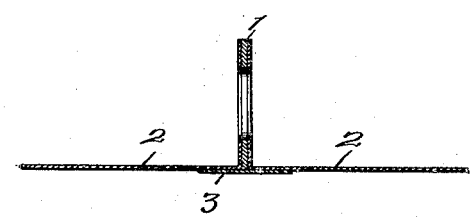
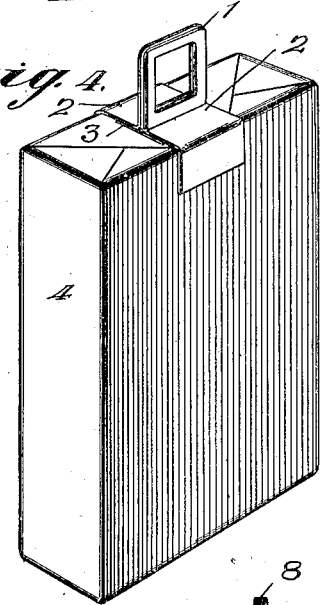
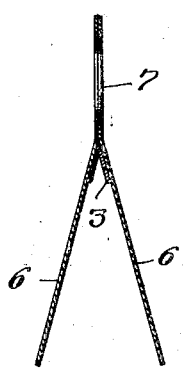
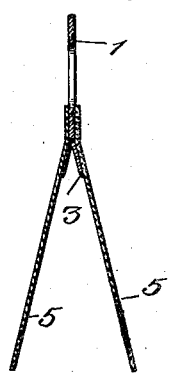
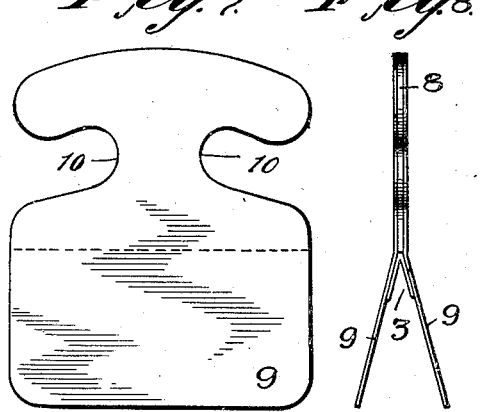
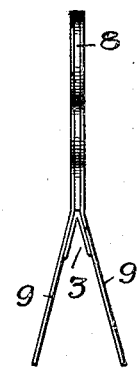
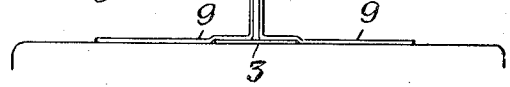
INVENTOR
Theodore H. Krueger
BY
Moses Hammond & Middleton
ATTORNEYS

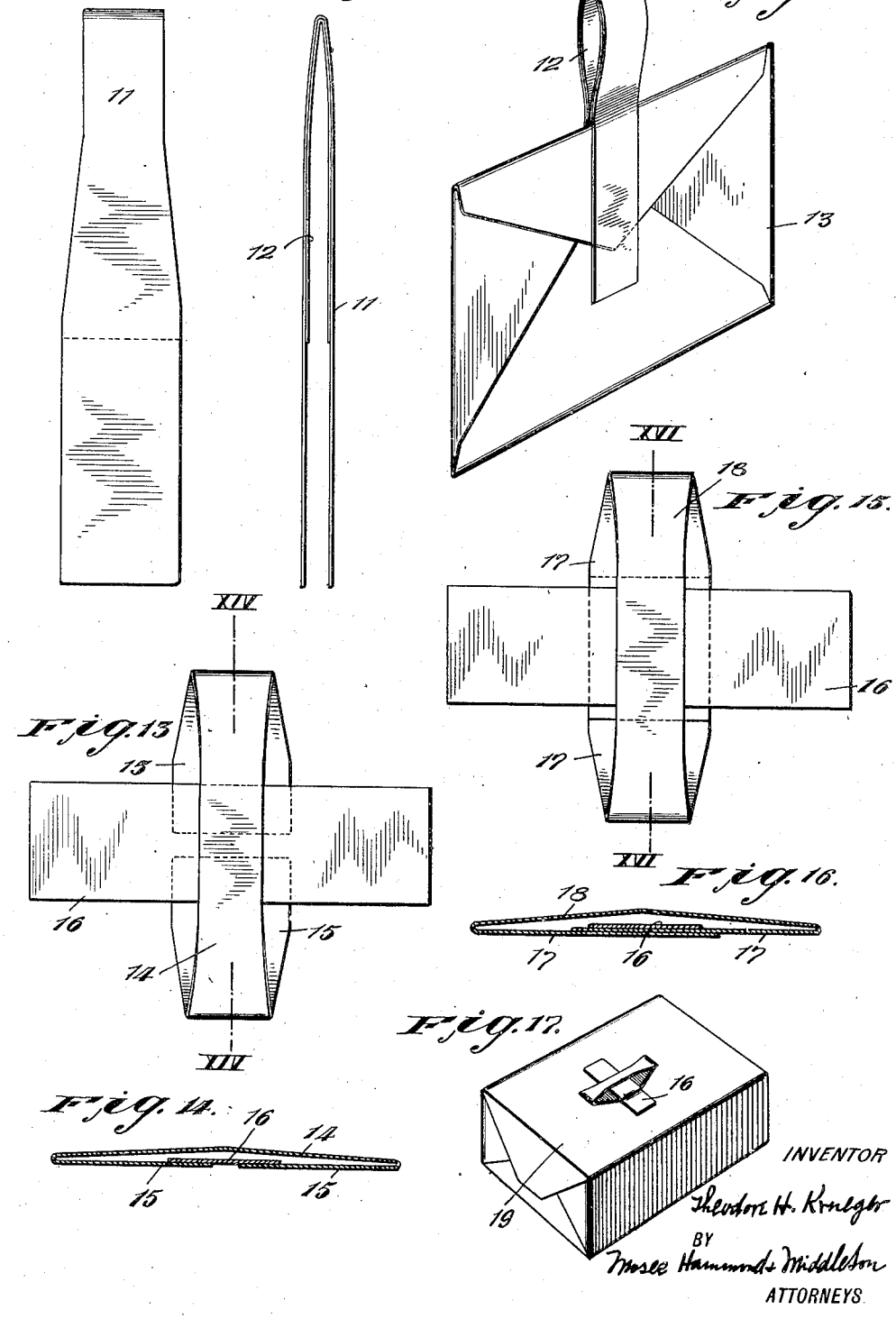

Jan. 27, 1925.
T. H. KRUEGER
1,524,399
CARRIER FOR PACKAGES AND THE LIKE
Filed Jan. 7, 1921        5 Sheets-Sheet 3
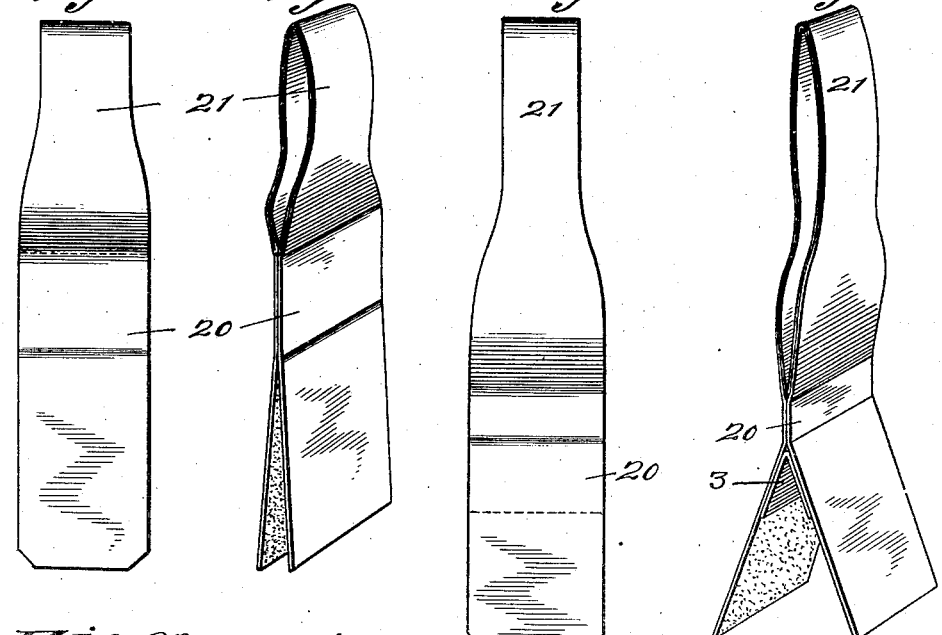
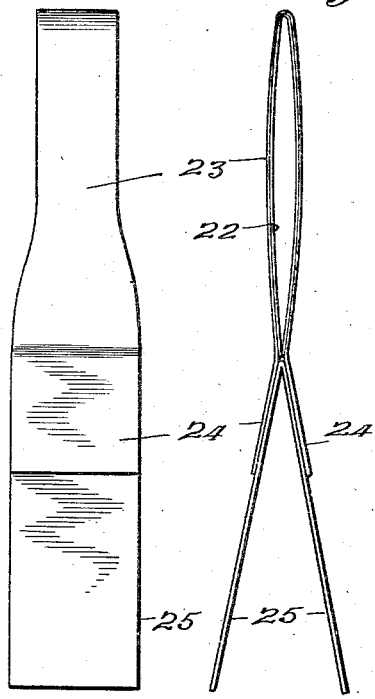
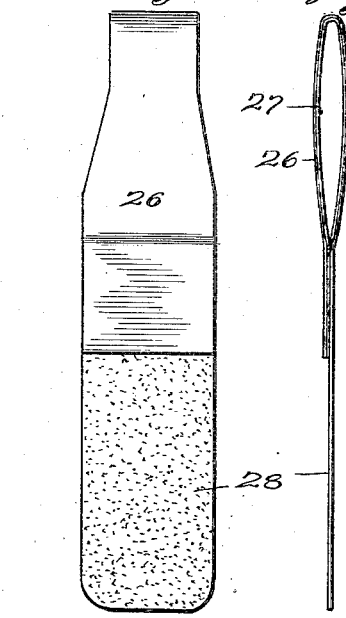
INVENTOR
Theodore H. Krueger
BY
Moses Hammond & Middleton
ATTORNEYS

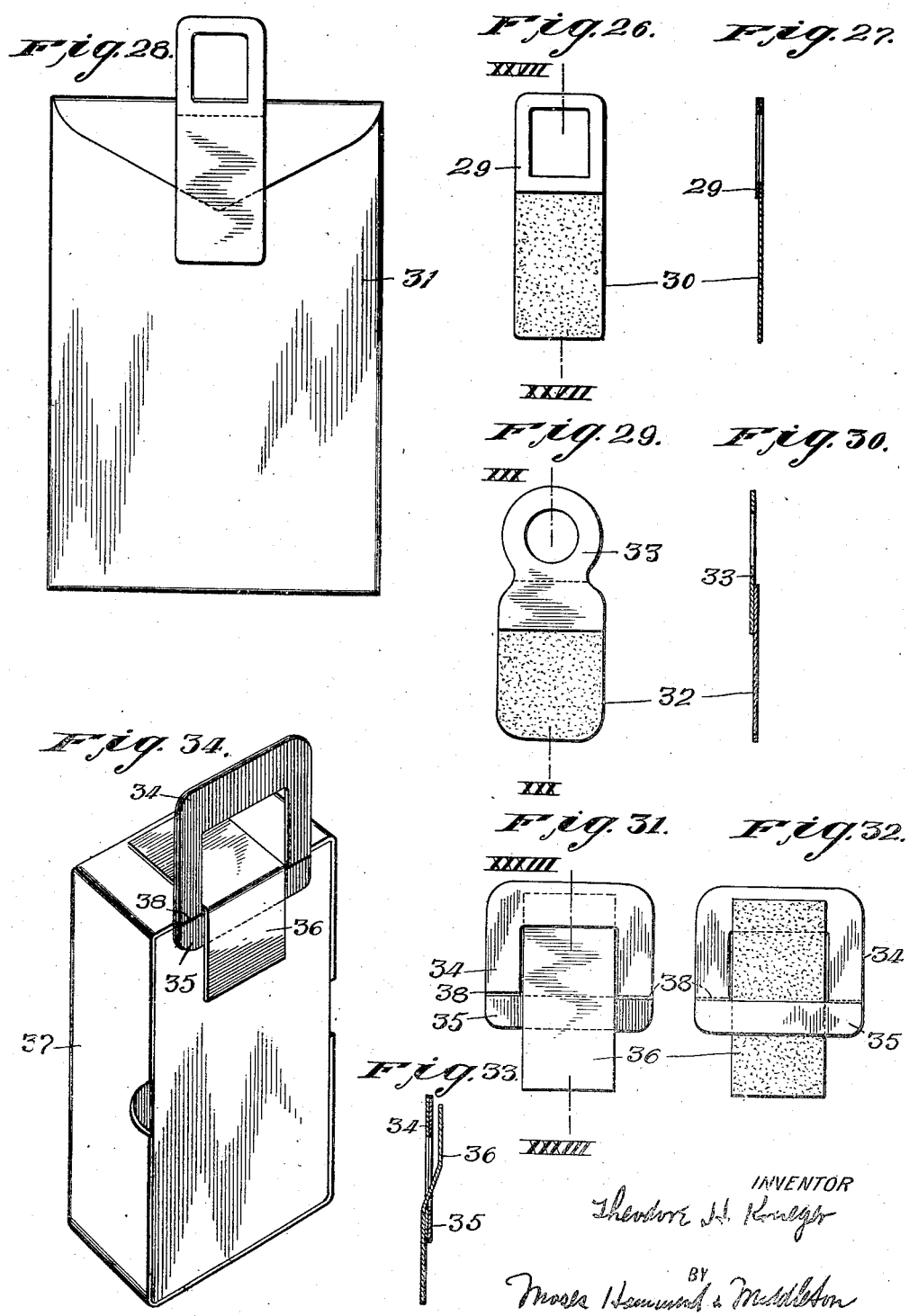

Jan. 27, 1925.
T. H. KRUEGER
1,524,399
CARRIER FOR PACKAGES AND THE LIKE
Filed Jan. 7, 1921    5 Sheets-Sheet 5
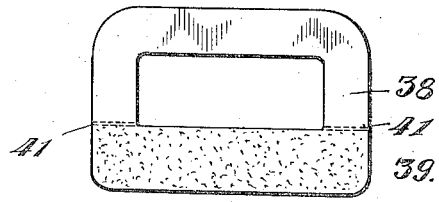
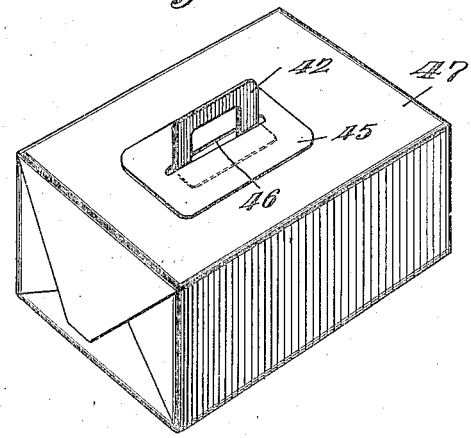
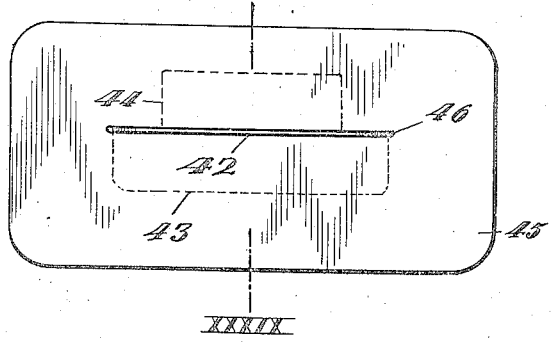
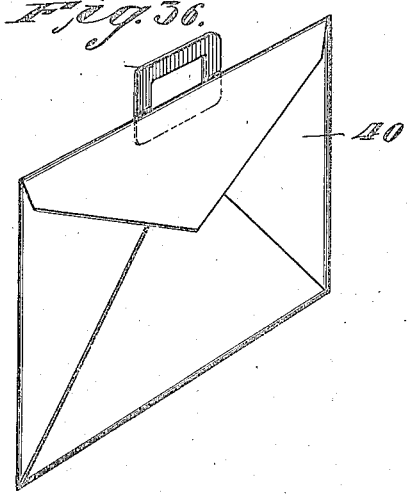
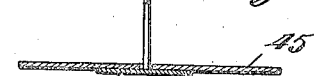
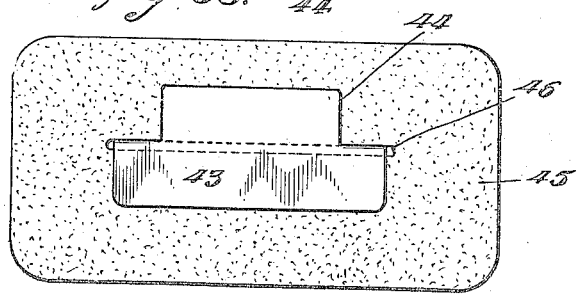
INVENTOR
Theodore H. Krueger
BY
Munn Hammond & Middleton
ATTORNEYS Patented Jan. 27, 1925.

1,524,399

UNITED STATES PATENT OFFICE.

THEODORE H. KRUEGER, OF NEW YORK, N. Y.

CARRIER FOR PACKAGES AND THE LIKE.

Application filed January 7, 1921. Serial No. 435,631.

*To all whom it may concern:*

Be it known that I, THEODORE H. KRUEGER, a citizen of the United States, residing in the city, county, and State of New York, have invented certain new and useful Improvements in Carriers for Packages and the like, of which the following is a specification.

This invention relates to improvements in carriers for packages, containers, envelopes and other similar articles, and has for its object to provide a carrier which is simple in construction, economical to manufacture, and which may be readily affixed to a package or the like without employing extraneous means, to permit of the package or the like being carried in a convenient manner.

The carrier forming the subject matter of the invention is especially adapted to be used in connection with packages or the like which are provided with self-closing or self-sealing means, or which are sealed with gummed tape, as in such instances no cord or string is employed and therefore the usual cord-engaging handles can not be used as carriers. It will, of course, be understood, however, that, if desired, my improved carrier may be used also in connection with packages or the like which are held closed by cord.

The invention further has for its object to provide a carrier adapted, under certain conditions, to serve to seal the package or the like to which it is affixed.

In the accompanying drawings forming part of this specification, wherein I have shown several preferred embodiments of my invention for the purpose of illustrating the principle thereof, Figure 1 is a view in side elevation of a carrier constructed in accordance with and embodying the invention;

Figure 2 is a sectional view taken on the line II—II of Figure 1;

Figure 3 is a view similar to Figure 2, the parts being shown in position for attachment to a package or the like;

Figure 4 is a perspective view of a package having the carrier affixed thereto;

Figures 5 and 6 are views similar to Figure 2, showing modified forms of the carrier;

Figures 7 and 8 are side and end views, respectively, of a further modification of the carrier;

Figure 9 is an end view showing the carrier, illustrating one manner of affixing the carrier, shown in Figures 7 and 8, to a package;

Figures 10 and 11 are side and end views, respectively, of a further modification;

Figure 12 is a perspective view of an envelope having affixed thereto the carrier shown in Figures 10 and 11;

Figure 13 is a plan of a further modification;

Figure 14 is a sectional view taken on the line XIV—XIV of Figure 13;

Figure 15 is a plan of a further modification;

Figure 16 is a sectional view taken on the line XVI—XVI of Figure 15;

Figure 17 is a perspective view of a package having affixed thereto a carrier such as is shown in Figures 13 and 14, or Figures 15 and 16.

Figures 18 and 19 are side and perspective views, respectively, of a further modification;

Figures 20 and 21 are views similar to Figures 18 and 19, of a further modification;

Figures 22 and 23 are side and end views, respectively, of a further modification;

Figures 24 and 25 are views similar to Figures 22 and 23, of a further modification;

Figure 26 is a side view of a further modification;

Figure 27 is a sectional view taken on the line XXVII—XXVII of Figure 26;

Figure 28 shows an envelope having affixed thereto the carrier shown in Figures 26 and 27;

Figures 29 and 30 are views similar to Figures 26 and 27 of a further modification;

Figures 31 and 32 are side views, taken from opposite sides, of a further modification;

Figure 33 is a sectional view taken on the line XXXIII—XXXIII of Figure 31;

Figure 34 is a perspective view of a package having affixed thereto the carrier shown in Figures 31, 32 and 33;

Figure 35 is a side view of a further modification;

Figure 36 is a perspective view of an envelope having affixed thereto the carrier shown in Figure 35;

Figure 37 is a top view of a further modification;

Figure 38 is a bottom view thereof;

Figure 39 is a sectional view taken on the line XXXIX—XXXIX of Figure 37, and

Figure 40 is a perspective view of a package having affixed thereto the carrier shown in Figures 37, 38 and 39.

Referring to Figures 1, 2, 3 and 4, the carrier is shown as comprising a member 1 shaped to constitute a hand-hold provided with an opening adapted to receive one or more fingers and preferably formed of heavy paper, cardboard or other similar material. Strips of flexible paper, 2, have their upper ends secured to the opposite side of the member 1, and the lower free ends of the strips, which normally extend downwardly with respect to the member 1, as shown in Figure 2, have their inner or facing surfaces coated with an adhesive. The strips 2 are preferably formed of gummed tape such as is commonly employed, in place of cord or string, for sealing packages and the like. The upper ends of the strips, which have openings formed therethrough registering with the opening in the member 1, together with the member 1 constitute the handle portion of the carrier, and the free ends of the gummed strips 2 constitute the package-engaging portions of the carrier. It will be seen that the handle portion of the carrier is stiff or rigid as compared with the package-engaging portions thereof, which are flexible. In order to take up the strain on gummed strips 2 when the package-engaging portions thereof are affixed to a package or the like, and to prevent the gummed strips from separating or becoming detached from the member 1, a member 3, which may be a piece of gummed tape, paper or the like, is secured to the inner ends of the package-engaging portions of the carrier, as clearly shown in Figures 2 and 3.

To secure the carrier to a package, the free ends of the gummed strips 2, which constitute the package-engaging portions of the carrier, are spread apart or extended laterally in opposite directions from the handle portion, and the gummed surfaces are then moistened and placed in engagement with the surface of the package whereby to affix the carrier thereto. As shown in Figure 4, the carrier is affixed to one end of a package 4, the outer ends of the package-engaging portions of the carrier being shown secured to the sides of the package. When the carrier is thus affixed to a package it will be seen that it serves to seal the end thereof to which it is affixed, thereby avoiding the necessity of using separate sealing means. It will of course be understood that, if desired, the carrier may be affixed to the central portion of one of the sides of the package in the manner indicated in Figure 17, for example, in which instance it does not serve as a seal. The member 3 takes up any strain to which the free ends of the gummed strips may be subjected, when the package is being carried, and effectually prevents separation of the gummed strips, or the detaching of the same from the member 1, when the carrier is in use.

The carrier shown in Figure 5, which is similar to the one shown in Figures 1, 2 and 3, differs therefrom only in that the flexible strips of gummed tape 5 are secured to the member 1 only at the lower portion thereof which is positioned below the finger opening.

Referring to Figure 6, the carrier is shown as consisting of two strips of gummed tape 6 secured to one another throughout a portion of their length to form a handle portion 7 which has a finger receiving opening extending therethrough.

The carrier shown in Figures 7, 8 and 9 is similar in construction to the one shown in Figures 1, 2 and 3, differing therefrom merely in the shape of the handle portion formed by the member 8 and the ends of the strips of gummed tape 9 secured to the opposite sides thereof. Instead of having a finger receiving opening formed in the handle portion, as shown in Figure 1, the handle portion of the carrier shown in Figure 7 is provided with inwardly-extending recesses 10 adapted to receive the fingers of the hand. The carrier is secured to a flat surface of a package as indicated in Figure 9.

In Figures 10 and 11, there is shown a carrier consisting of two strips 11 and 12, of paper or the like, the strips being of different lengths and being secured to one another in such a manner as to provide an intermediate portion of double thickness and end portions of single thickness which are provided in their inner or facing surfaces with a coating of adhesive. The carrier is preferably formed of strips of gummed tape secured to one another along their gummed surfaces. The gummed ends constitute the package-engaging portions of the carrier and the intermediate part formed by the two strips constitutes the handle portion. In Figure 12, the carrier is shown affixed to an envelope 13 for the purpose of illustrating the manner in which it is used.

In Figures 13 and 14 there is shown a carrier comprising a strip 14 of paper or the like forming a handle, and having downwardly and inwardly bent portions 15 connected to one another by a transverselyextending strip of gummed tape 16 secured to the upper surfaces of the spaced ends thereof. In the carrier shown in Figures 15 and 16, which is similar in construction to the one shown in Figures 13 and 14, the ends of the downwardly and inwardly bent portions 17 of the strip 18 are secured to one another in overlapping relation, and the strip of gummed tape 16 is secured intermediate its ends, to the uppermost end portion. Both of these carriers are affixed to a package 19 by means of the free package-engaging end portions of the gummed strip 16, as clearly shown in Figure 17.

The carrier shown in Figures 18 and 19 is similar to that shown in Figures 10 and 11, but differs therefrom in that the portions of single thickness are secured to one another adjacent their upper ends, as indicated at 20, thereby forming a handle portion 21 in the form of a loop. The carrier shown in Figures 20 and 21 is similar in construction to that shown in Figures 18 and 19, but is provided with a member 3 secured to the inner ends of the package-engaging portions to prevent them from separating, as described above in connection with the carrier shown in Figures 1, 2 and 3.

In Figures 22 and 23 there is shown a carrier consisting of two strips 22, 23 of paper or the like, preferably gummed tape, secured to one another, the outer strip 23 being slightly longer than the inner strip 22 to provide end portions 24 which are secured to the outer ungummed surface of a folded strip of gummed tape 25 adjacent the fold thereof, thereby forming a loop of double thickness which serves as a handle, the gummed portions of the folded strip 25 serving as package-engaging portions whereby the carrier is affixed to a package or the like.

Referring to Figures 24 and 25, the carrier consists of two strips 26, 27 of gummed tape, of different lengths, secured to one another in such a manner as to form a portion of double thickness and a portion of single thickness. The portion of double thickess is folded upon itself and the end thereof is secured to the upper or inner end of the gummed surface of the portion of single thickness to form a loop adapted to be grasped by the hand. The carrier is affixed to a package or the like by means of the exposed gummed surface 28.

The carrier shown in Figures 26 and 27 comprises a member 29 of paper or the like having a finger and receiving opening formed therethrough, and to one side of which is secured one end of a strip of gummed tape 30, the other end of which serves to affix the carrier to a package such as an envelope 31, as shown in Figure 28. When the carrier is thus secured to an envelope, it may serve as a seal therefor. A similar construction is shown in Figures 29 and 30, but in this case the gummed tape 32 is secured only to that portion of the member 33 which is below the finger hole, and the member 33 differs in shape somewhat from the member 29 shown in Figure 26.

In Figures 31, 32 and 33 there is shown a carrier comprising a member formed of stiff paper, card-board or the like, consisting of a U-shaped handle 34 and a transverse portion 35 to which a strip of gummed tape 36 is secured intermediate its ends, one free end of the tape being adapted to be attached to a package at one side of the transverse member and the other free end of the tape extending through the handle whereby it may be attached to the package at the other side of the transverse portion. One manner of affixing this carrier to a package is clearly illustrated in Figure 34 wherein the carrier is shown as being secured to a box 37 in such a manner that the same is maintained closed. In order to permit the carrier to be secured to the flat surface of a package, if desired, scorings 38 are provided at the junctions of the ends of the handle 34 with transverse portion 35, whereby the handle may be bent upwardly with respect to the transverse portion in a manner similar to that shown in Figure 40.

The carrier shown in Figure 35 comprises a member consisting of a handle portion 38 and a transverse portion 39 having one surface coated with an adhesive by which the carrier may be affixed to an envelope 40, or the like, as shown in Figure 36. By scoring the member at the junction of the ends of the handle portion with the transverse portion, as indicated at 41, the handle portion may be bent upward at right angles to the transverse portion and the carrier may then be affixed to a package in a manner similar to that shown in Figure 40.

The carrier shown in Figures 37, 38 and 39 comprises a member consisting of a handle portion 42 and portions 43 and 44 extending laterally from the lower end thereof in opposite directions with respect thereto. A piece of gummed tape 45 of substantially greater area than the area of the laterally extended portions has a slit 46 formed therein and is slipped over the handle portion and secured to the upper surfaces of the laterally extending portions. This carrier is affixed to a package 47 by means of the exposed gummed surface of the piece of tape, as indicated in Figure 40.

It will be seen that the several carriers hereinabove described, and shown in the drawings, are adapted to be affixed to a package or the like without employing extraneous means, and that in each of the modifications shown and described the carrier includes a handle portion and a gummed package engaging which serves to affix the carrier to a package.

It is, of course, understood that the several carriers may be formed of any suitable materials and that, in making the carriers, I may employ strips of gummed tape, which is paper coated with an adhesive, or, if desired, I may employ strips of ungummed paper to which an adhesive is subsequently applied. It is also to be understood that the strain-take-up member 3 may be omitted from the carriers which include the same, if the carrier is intended to be used in connection with envelopes or like packages, as in such case there is but little tendency for the gummed package surfaces to separate.

In making the carriers, the ungummed portions of the handle can be formed by gumming only the ends of the piece or by gumming the entire length of the piece and covering the intermediate zone with an additional piece of paper, which adheres to and covers the gummed portion.

While I have illustrated and described my invention in connection with several preferred embodiments thereof, it will be understood that I do not limit myself to the specific embodiments shown, but that I intend to cover my invention broadly in whatever form its principle may be employed.

Having described my invention, I claim:

1. A carrier for packages or the like, said carrier including a handle portion, gummed package-engaging portions at opposite sides of said body portion and adapted to be extended outwardly with respect thereto, whereby said gummed portions may be secured to a package at opposite sides of said handle portion, and means to take up the strain upon said gummed portions when the package is being carried.

2. A carrier for packages or the like, said carrier including a handle portion, gummed package-engaging portions at opposite sides of said body portion and adapted to be extended outwardly with respect thereto, whereby said gummed portions may be secured to a package at opposite sides of said handle portion, and means for holding said gummed portions against separating.

3. A carrier for packages or the like, said carrier including a handle portion, gummed package-engaging portions at opposite sides of said handle portion and adapted to be extended outwardly with respect thereto, whereby said gummed portions may be secured to a package at opposite sides of said handle portion, and means secured to the inner portions of said gummed package-engaging portions to take up the strain when the package is being carried.

4. A carrier for packages or the like, said carrier including a member shaped to form a hand-hold, flexible members secured to said hand-hold member at opposite sides thereof and having gummed portions adapted to be fixed to a package at opposite sides of said hand-hold member, and means for preventing said flexible members from being detached from said hand-hold member.

5. A carrier for packages or the like, said carrier including a member shaped to form a hand-hold, flexible members secured to said hand-hold member at opposite sides thereof and having gummed portions adapted to be affixed to a package, and strain-take-up means secured to said flexible members adjacent their points of connection with said first-named member.

6. A carrier for packages, envelopes and the like, comprising a hand-hold portion formed of relatively stiff material, and a package engaging portion formed of relatively flexible material, said last-mentioned portion being gummed.

7. A carrier for packages, envelopes and the like, comprising a hand-hold portion formed of relatively stiff material, and a package engaging flap formed of gummed, flexible material, said flap extending longitudinally from said hand-hold portion and being greater in length than in width so that the strain of carrying is transmitted longitudinally through said flap.

8. A carrier for packages, envelopes and the like, comprising a member of relatively stiff sheet material formed to serve as a hand-hold, and a strip of gummed material, said strip having a portion applied to said stiff member and a portion extending beyond said stiff member for being applied to a package or the like, the said strip being formed of relatively flexible material so that it may be caused to adhere readily to the package.

9. A carrier for packages, envelopes and the like, comprising a relatively stiff hand-hold portion provided with a plurality of extensions, said extensions being thinner and more flexible than the hand-hold portion and being gummed for being applied to the package.

10. A carrier for packages, envelopes and the like, comprising a hand-hold portion formed of a member of stiff sheet material, and a pair of strips of gummed flexible sheet material applied over each face of said member, said flexible strips extending beyond said stiff member to form relatively long package engaging members.

11. A carrier for packages, envelopes and the like, comprising a hand-hold portion formed of a plurality of layers of sheet material, the outer layers of said portion being formed of gummed material and extending beyond the said hand-hold portion for being applied to the package at opposite sides of the hand-hold portion, and a member of sheet material bridged across said flaps to take up the strain therein when the package is being carried.

12. A carrier for packages, envelopes, and the like, comprising a hand-hold portion formed of a plurality of layers of sheet material, the inner layers being ungummed on their exposed surfaces, the outer layers of said portion being gummed and extending beyond the hand-hold portion for application to a package at opposite sides of the hand-hold portion.

13. A carrier for packages, envelopes, and the like, comprising a strip of sheet material having an ungummed portion in the middle forming a closed loop for the insertion of the hand therein and having the ends of the strip gummed for application to the package at opposite sides of the ungummed portion.

14. A carrier for packages or the like comprising a strip of sheet material, an exposed gummed portion at each end for attachment to a package and a portion between said gummed portions forming a hand-hold and a hole in said hand-hold portion for the insertion of the hand.

In testimony whereof I have affixed my signature to this specification.

THEODORE H. KRUEGER.